Patented June 11, 1940

2,203,883

UNITED STATES PATENT OFFICE 2,203,883

SULPHURIC ACID ESTERS OF ALCOHOL ETHERS CONTAINING A CARBOCYCLIC GROUP

Adolf Steindorff, Gerhard Balle and Paul Heimke, Frankfort-on-the-Main, and Karl Horst, Hofheim in Taunus, Germany, assignors to I. G. Farbenindustrie Aktiengesellschaft, Frankfort-on-the-Main, Germany No Drawing. Application May 4, 1937, Serial No. 140,706. In Germany December 12, 1935

5 Claims. (Cl. 260—457)

The present invention relates to sulphuric acid esters of alcohol ethers containing a carbocyclic group.

This application is a continuation-in-part of U. S. Patent No. 2,083,482.

We have found that organic compounds having an acid character are obtainable by introducing into the hydroxyl group of an aromatic or hydroaromatic hydroxy-compound which contains as a substituent in the nucleus at least one aliphatic radical with more than three carbon atoms, an aliphatic radical which contains an acid salt-forming group, and whose carbon chain is interrupted at least once by oxygen, nitrogen, sulphur or the like.

The new compounds correspond with the general formula: R—O—R₁—X wherein R means an aromatic or hydroaromatic radical containing as a substituent at least one aliphatic or aliphatic-aromatic radical with more than three carbon atoms and which may contain another substituent, R₁ means an aliphatic radical the carbon chain of which is interrupted at least once by oxygen, nitrogen, sulphur or the like and X means an acid salt-forming group.

In the form of their water-soluble salts the new bodies are for the greater part nearly colorless powders or viscous masses which are more or less easily soluble in water according to their molecular weight and composition.

The free acids are in part crystalline bodies, in part oily liquids or viscous masses; some of them are soluble in water as, for instance, the sulphonic acids, and glycolic ether carboxylic acids, others are insoluble in water.

The new compounds may be made as follows:

In order to introduce the aliphatic radicals in question —R₁—X into alkylated phenols or alkylated hydroaromatic hydroxy compounds there may be used the corresponding ready-made aliphatic bodies, that is to say an alkylated phenol or an alkylated hydroaromatic hydroxy-compound is caused to react with, for instance, beta-chlor-diethylether-beta'-sulphonic acid; alternatively, a suitable aliphatic radical may be first introduced into the aromatic or hydro-aromatic hydroxy-compound by a single reaction or by several reactions and then the acid salt-forming group is introduced.

As parent material for the manufacture of the new compounds there may be used as alkylated aromatic hydroxy-compounds: para-n-butylphenol, amylcresol, di-iso-butylphenol, iso-hexylnaphthol, oleylphenol, iso-dodecylphenol, iso-octylresorcinol and the like; as alkylated hydro-aromatic hydroxy-compounds, for instance: di-iso-butylcyclohexanol, iso-hexylcyclohexanol and the like. The hydroaromatic compounds may be made, for instance, by a catalytic nuclear hydrogenation of the aforesaid corresponding aromatic compounds.

These bodies may be caused to react, as stated above, with bodies which contain a reactive halogen atom, an oxygen-, nitrogen- or sulphur-oridge and an acid salt-forming radical. As example of such a body there has been mentioned the beta-chlordiethyl-ether-beta'-sulphonic acid (Cl—CH₂—CH₂—O—CH₂—CH₂—SO₃H). The new compounds may also be made in stages, for instance, by causing one of the said parent materials to react with a halogen-hydrine or an alkylene oxide to form a product of the probable constitution:

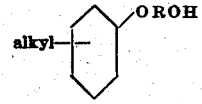

wherein R means an aliphatic hydrocarbon radical, and introducing in known manner an acid salt-forming group into the product obtained, for instance, by reaction with a halogen fatty acid, by a partial esterification with a dibasic aliphatic carboxylic acid, by introduction of radicals of polybasic oxygen containing mineral acids or by introducing a sulphonic acid group. Before introducing such an acid group it may be of advantage—in case a radical of a polybasic oxygen-containing mineral acid is introduced, it is necessary—to repeat, once or several times, the reaction with a halogen hydrine or an alkylene oxide whereby the intermediate products of the following probable constitution are obtained:

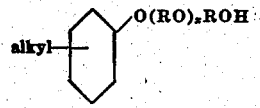

wherein R means an aliphatic hydrocarbon radical and x means 1 or a higher whole number.

By this sequence of reactions bodies are obtained in which the aliphatic radical carrying the acid group is interrupted at least once by oxygen. In an analogous manner there may be obtained bodies in which the said radical is interrupted by nitrogen or sulphur. For instance, an alkyl-phenol or an oxalkylated phenol may be esterified with thiodiglycolic acid, or an alkylated phenol is caused to react with a halogen-alkyl-sulphonic acid, the corresponding sulpho-chloride made therefrom is reduced to the sulphinic acid and halogen fatty acid is caused to react therewith, whereby bodies of the probable constitution:

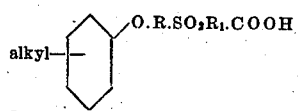

are obtained.

In the form of their water-soluble salts the new acid compounds possess a considerable capacity for reducing surface tension, so that they may be used with special advantage in the textile industry, for instance as wetting, emulsifying, dispersing and cleansing agents as well as in the leather industry and in all cases where substances capable of reducing surface tension are required. Some of the said compounds may also be used in the pharmaceutical art.

The water-soluble salts of the new sulphuric acid esters may be used as such or in combination with other products, for instance, with products having capillary-active properties such as soaps, soap substitutes, purifying, emulsifying and dispersing agents stable to the hardness of water, the water-soluble salts of the phosphorus acids and products having a similar effect, bleaching agents and diluents. They may also be used together with organic solvents.

The following examples serve to illustrate the invention, but they are not intended to limit it thereto; the parts are by weight:

(1) 294 parts of tertiary-octylphenyl-diglycol ether:

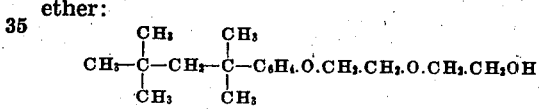

preparable by causing 2 mols of ethylene oxide to act upon 1 mol of tertiary octylphenol or by causing tertiary octylphenol-sodium to react with the equivalent quantity of diglycol-mono-chlorhydrine: $Cl.CH_2.CH_2.O.CH_2.CH_2.OH$, are dissolved in 500 parts of diethyl ether and the solution is cooled to $+5°$ C. 145 parts of chlorosulphonic acid are then caused to run in, while well stirring, care being taken that the temperature does not exceed $+15°$ C. All of the chlorosulphonic acid having been introduced, the melt is further stirred for a short time and then poured on 300 parts of ice, the whole is well mixed and neutralized by means of a caustic soda solution of 40% strength, about 175 parts of the latter being necessary.

As soon as the mixture shows a feebly alkaline reaction, the ether is distilled off under ordinary pressure, the water being distilled under reduced pressure. There remains a soap-like mass which solidifies on cooling and which may be pulverized. The product is the sodium salt of the sulphuric acid ester of tertiary octyl-phenyl-diglycol ether. It is soluble in water, its solutions foam very strongly and are suitable for wetting textiles.

(2) 394 parts of iso-dodecylphenyl-triglycol ether: $C_{12}H_{25}-C_6H_4.O(CH_2.CH_2.O)_3H$ obtainable by condensing phenol with the mixture of olefines containing about 12 C-atoms and formed by polymerization of propylene and reacting with 3 mols of ethylene oxide are dissolved in 500 parts of methylene chloride and the solution is cooled to $+5°$ C. 140 parts of fuming sulphuric acid containing 20 per cent. of sulphuric anhydride are then caused to run in, care being taken that the temperature of the solution does not exceed $+15°$ C. Thereupon, the mixture is further stirred for 2 hours at 10° C. 400 parts of finely ground ice are then added, while stirring, to the mixture and the whole is rendered neutral to litmus by addition of a caustic soda solution, about 150 parts of a caustic soda solution of 40 per cent. strength being necessary. After distillation of the solvent and about 80 parts of water, which pass over when removing the last portions of the solvent in vacuo, 1000 parts of an aqueous paste (of about 50 per cent. strength) of the sodium salt of the acid sulphuric acid ester of the iso-dodecylphenyl-triglycol:

are obtained which still contains, beside water, some sodium sulphate. The paste dissolves in water to a clear, strongly foaming solution having a good power for washing white goods.

(3) 470 parts of a polyglycol ether, the polyglycol ether chains of which consist of about 5 ethenoxy groups and are bound to a mixture of alkyl phenols mainly consisting of iso-decyl-cresols and having the formula:

obtainable by condensing crude cresol with a monochlorinated petroleum fraction containing hydrocarbons of about 10 C-atoms in the presence of $AlCl_3$ or zinc dust and reacting the iso-decyl-cresol with 5 mols of ethylene oxide, are cooled to 5° C.-8° C. and 140 parts of chlorosulphonic acid are caused to run in, while well stirring, care being taken that the temperature of the sulphonation mass does not exceed $+18°$ C. After the introduction of the chloro-sulphonic acid, the mass has become rather viscous and is further stirred for about 4-6 hours, at a temperature of about 15° C. to 18° C. 450 parts of ground ice are then added and the whole is neutralized by means of about 160 parts of a caustic soda solution of 40 per cent. strength. The solution is mixed with a saturated sodium sulphate solution containing 1280 parts of sodium sulphate, and the mixture is dried in a drying apparatus, for instance on a drying roll, or by atomizing. A colorless powder is obtained which contains, beside 20% of the sodium salt of the acid sulphuric acid ester of the above defined alkyl-cresyl-polyglycol ether, 80% of sodium sulphate. The powder may be used as washing agent.

A very effective washing agent is obtained, when adding to the powder also sodium carbonate, an alkali salt of a phosphoric acid, a bleaching agent, such as sodium perborate and a stabilizing agent for the latter, for instance, magnesium sulphate or magnesium silicate.

(4) Phenol is condensed with an olefine mixture prepared by polymerization of propylene by means of phosphoric acid and containing chiefly iso-dodecylene to form the iso-dodecyl-phenol. 262 parts of this product are mixed with 2 parts of a caustic soda solution of 40° Bé, and ethylene oxide is introduced, at about 160° C.-180° C., into the mixture until the increase of weight corresponds to an absorption of 532 parts of ethylene oxide, i. e. until the iso-dodecylphenol has been etherified by means of a polyglycol ether chain formed by about 10 mols of ethylene oxide. The polyglycol ether obtained

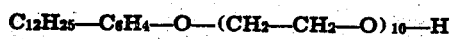

is soluble in water and has good properties of capillary action.

80 parts of this polyglycol ether are dissolved in 150 parts of diethyl ether and they are transformed into the sulphuric acid ester of the dodecylphenyl-polyglycol ether, by causing 12 parts of chlorosulphonic acid to drop in. The reaction complete, the hydrochloric acid formed is removed by blowing dry air, the solution is poured on ice and the solution of the sulphonate is neutralized by means of caustic soda solution and rendered feebly alkaline to phenol-phthalein. The ether is removed by heating and the solution of the sodium salt is evaporated to dryness. A viscous mass is obtained which is easily soluble in water and the solutions of which have a good foaming and wetting power.

There may also be used, instead of the iso-dodecylphenol, other isomeric dodecylphenols, for instance such as are prepared by condensation of phenol and an iso-dodecylene obtainable by dimerization of the iso-hexylene preparable by dehydrating the iso-hexyl alcohol formed, beside other alcohols, during the reduction of carbon oxide; furthermore, there may be used, for instance, a dodecylphenol prepared by condensation of phenol with the mono-chlorination product of a middle oil from natural or synthetic hydrocarbon oils consisting, for the main part, of hydrocarbons containing 12 carbon atoms; there may be used also n-dodecylphenol preparable, for instance, by condensation of phenol with lauric acid to obtain the p-hydroxy-laurophenone and by reduction of this product to the p-dodecylphenol or the dodecyl-cyclohexanol.

(5) By polymerization of propylene in the presence of phosphoric acid there may be obtained a polymeric olefine containing about 9 carbon atoms. By condensation of such iso-nonylene fractions with phenol, in the presence of $AlCl_3$, $BF_3$, $H_2SO_4$ and the like, there is obtained a mixture of isomeric isononylphenols which may be transformed, by catalytic reduction with nickel catalysts, into a mixture of isomeric iso-nonyl-cyclohexanols.

400 parts of a polyglycol ether of these iso-nonylcyclohexanols, the polyglycol ether radical of which is, in general composed of 3 propylene oxide molecules having the formula:

are dissolved in 600 parts of liquid sulphurous acid. 140 parts of chlorosulphonic acid are introduced into the solution, the reaction heat formed being paralyzed by the cold due to the evaporation of the sulphurous acid. The solution is then neutralized by means of 300 parts of a caustic soda solution of 20 per cent. strength, whereby nearly all of the solvent is distilled off. The residue is rendered feebly alkaline to phenolphthalein and evaporated to dryness under reduced pressure. A mass having a feebly yellowish coloration is obtained; it dissolves in water to a clear solution having good wetting properties.

(6) Iso-hexyl alcohol which is present, for instance, in the high-boiling fractions obtained in the synthetic preparation of methanol, is dehydrated in known manner to form iso-hexylene and this product is dimerized to the di-iso-hexylene (-iso-dodecylene). This olefine fraction may be condensed, by means of $BF_3$ and beta-naphthol to form the iso-dodecyl-beta-naphthol. By treating this naphthol derivative with glycide, a polyglycerine ether of the iso-dodecyl-beta-naphthol of the following constitution is obtained:

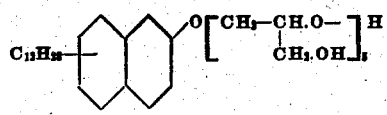

682 parts of this poly-glycerine ether are dissolved in 600 parts of carbon tetrachloride, and 100 parts of sulphuric monohydrate are caused to run, while well stirring, into the solution which has been cooled to $+5°$, care being taken that the temperature does not exceed $+15°$ C. The mixture is further stirred at $15°$ C.–$20°$ C., for about 1–3 hours, and it is then poured, while stirring, on about 400 parts of ice-water. The whole is then neutralized by means of a caustic soda solution of 40 per cent. strength, about 100–110 parts being necessary. After distillation of the solvent and the water, the latter being best performed under reduced pressure, a viscous black-brown melt is obtained, the sodium salt of the acid sulphuric acid ester of the iso-dodecylnaphthol-poly-glycerine ether.

(7) When using, as indicated in Example 6, a fraction of the high-boiling products obtained by the synthetic preparation of methanol or iso-butyl-alcohol and containing, for the main part, isohexyl and isoheptyl alcohol, and treating it in the same manner, a mixture is obtained containing, on an average, olefines with 13 carbon atoms. The olefine mixture obtained is condensed in known manner, by means of crude cresol to form a crude C-alkyl-cresol and catalytically hydrogenated to a mixture of C-alkyl-methyl-cyclo-hexanols. By causing 2 mols of 1,2-butylene oxide to act upon the product of hydrogenation, a polyglycol ether of the following constitution is obtained:

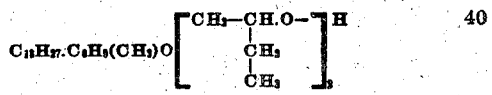

600 parts of this ether are caused to run slowly into 186 parts of fuming sulphuric acid containing 20% of sulphuric anhydride the temperature of the sulphonation mass being maintained at about $15°$ C.–about $18°$ C. The mass is further stirred, for about 4 hours, at $18°$ and 910 parts of ice are added thereto, the mass is then neutralized with about 300 parts of a caustic soda solution of 40 per cent. strength. The resultant paste consists to 35% of the sodium salt of the alkyl-methyl-cyclohexyl-polybutanol ether; it contains, beside water, sodium sulphate. It dissolves in water to clear solutions which possess a good cleansing power.

(8) By condensation of stearic acid chloride with phenol according to the Friedel-Craft reaction, the p-stearoyl-phenol is obtained beside the o-stearoylphenol. By causing 15 mols of ethylene oxide to act upon the above mentioned ketone, a polyglycol ether of the following formula is obtained: $C_{17}H_{35}.CO.C_6H_4.O(CH_2.CH_2.O)_{15}H$.

1000 parts of this ether are dissolved in 1500 parts of diethyl ether and a mixture of 174 parts of chlorosulphonic acid and 200 parts of diethyl ether are introduced while stirring, at about $12°$ C.–$15°$ C. into the solution. The whole is further stirred for about 6 hours at $+15°$ C., then poured on 1000 parts of ice-water and neutralized by means of about 500 parts of a caustic potash solution of 28 per cent. strength. After distillation of the diethyl ether, the water is distilled off under slightly reduced pressure. There remains the potassium salt in the form of a wax-like nearly colorless mass.

(9) 450 parts of the polyglycol ether of the formula: $C_{12}H_{25}.C_6H_3(CH_3)O(CH_2.CH_2.O)_4H$ obtainable by condensation of commercial cresol with the mono-chlorination product of a middle oil formed during the hydrogenation of coal and containing, for the main part, hydrocarbons with 12 carbon atoms and by treatment of the alkyl-cresol formed with 4 mols of ethylene oxide, are sulphonated, at 10° C.–15° C., by means of 180 parts of fuming sulphuric acid containing 20% of sulphuric anhydride. The whole is further stirred for 6–8 hours, 450 parts of ice are added thereto and the mass is neutralized with 300 parts of an ammonia solution of 17 per cent. strength, the temperature not exceeding +20° C. An aqueous paste is obtained which contains 40% of the ammonium salt of the acid sulphuric acid ester of the iso-dodecyl-cresyl-polyglycol ether.

(10) 574 parts of the polyglycol ether:

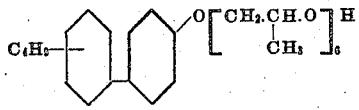

preparable by condensation of hydroxy-diphenyl with tertiary butyl-alcohol and subsequent treatment of the tertiary butyl-hydroxy-diphenyl with 6 mols of propylene oxide, are sulphonated, at 5° C.–12° C., by means of 174 parts of chlorosulphonic acid; the mixture is subsequently stirred for 4 hours, 600 parts of ice are then added thereto and the whole is neutralized by means of 270 parts of a caustic soda solution of 40 per cent. strength. After distillation of the water in vacuo, a viscous soft-resin-like product is obtained, the sodium salt of the acid sulphuric acid ester of the tertiary butyl-diphenyl-polypropylene-glycol ether.

(11) Into the di-isobutyl-phenol of the following constitution:

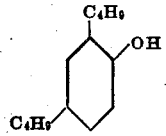

there may be introduced polyglycol ether chains of different length, by treating the phenol, at about 140° C.–160° C., with ethylene oxide in the presence of a small amount of caustic potash; products of the following general constitution are obtained:

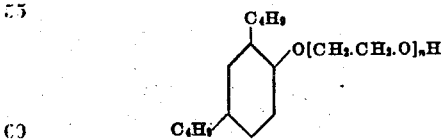

wherein $n$ may be every whole number greater than 1, the upper limit for $n$ being, for the present invention, about 100. All these polyglycol ethers may be transformed, by one of the methods indicated in the preceding examples, into the acid sulphuric acid esters or their sodium salts.

(12) 206 parts of para-tertiary octylphenol (obtainable by condensing phenol with di-iso-butylene) are melted and 2 parts of a caustic soda solution of 40 per cent. strength are added thereto. Ethylene oxide is introduced, while stirring, at a temperature of 120° C.–150° C. until 6 mols of ethylene oxide per one mol of para-tertiary octylphenol have been absorbed. An oil is obtained which is soluble in water except for a slight turbidity and which is an excellent cleansing agent for woolen fabrics. 470 parts of this tertiary-octylphenyl-polyglycol ether having a polyglycol ether chain consisting of 6 mols of glycol

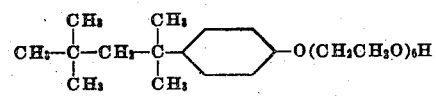

are dissolved in 600 parts of ether and 120 parts of chlorosulphonic acid are added to this solution at about 10° C. to about 20° C. while well stirring. The dissolved hydrogen chloride is eliminated by blowing in dry air; thereupon, the solution is diluted with ice water and rendered feebly alkaline to phenolphthalein by means of caustic soda solution at a temperature not exceeding +30° C. The sodium salt of the acid sulphuric acid ester of an iso-octylphenyl-polyglycol ether with an average content of 6 glycol radicals dissolves in water to a clear solution. The product constitutes a very good wetting agent for wool and cotton.

Instead of para-iso-octylphenol there may be used the mixture of alkylphenols obtained by condensing phenol with the commercial polymerization product of iso-butylene containing beside di-iso-butylene tri-iso-butylene and other olefines.

(13) 206 parts of tertiary octylphenol, prepared by condensing di-iso-butylene with phenol in the presence of boron-fluoride, are mixed with 0.7 part of powdered caustic soda and heated to 120° C.–130° C. under reduced pressure until the product is anhydrous. Propylene oxide is then introduced at a temperature between 160° C. and 180° C. until 580 parts of propylene oxide have been absorbed. A water-insoluble oil is obtained. This oil may be made soluble in water by converting it into an acid sulphuric acid ester, for instance, as follows:

786 parts of the tertiary-octylphenyl-polyhydroxypropyl ether

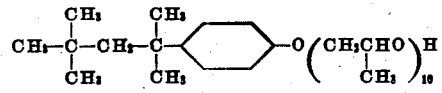

are dissolved in 1000 parts of ether and 120 parts of chlorosulphonic acid are slowly introduced into the solution, while well stirring, at a temperature of about 15° C. to about 20° C. The hydrochloric acid gas formed is then removed by means of a weak current of air. The ethereal solution is diluted with ice water, the whole is made feebly alkaline to phenolphthalein by means of caustic soda solution, the ether is first evaporated and then the aqueous solution is evaporated to dryness. There is obtained the sodium salt of the tertiary-octylphenyl-polyhydroxyl-propyl ether sulphonate in the form of a vitreous water-soluble mass.

(14) 262 parts of tri-iso-butylphenol

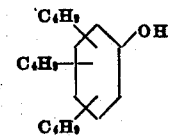

are treated with 220 parts of ethylene oxide according to the described methods. There is obtained a polyglycol ether containing in the polyglycol radical about 5 etheneoxy groups. By causing 482 parts of this oily product which may be emulsified with water to react at about 10° C. to about 15° C. with 120 parts of chlorosulphonic acid in a diethylether solution, there is obtained the corresponding sulphuric acid ester. The sodium salt of this ester is a product which is soluble in water to a clear solution. These solutions foam very strongly and are suitable for washing woolen, cotton and rayon fabrics.

(15) 130 parts of chlorosulphonic acid are gradually introduced, at 0° C.–10° C., into a well stirred mixture of 392 parts of iso-dodecylphenyl-tri-glycol ether as described in Example 2 and 600 parts of ethylene dichloride and the whole is stirred, for further 3–5 hours, at about 30° C. The reaction mixture is neutralized, while cooling, with dilute caustic soda solution, the solvent is blown off and the clear aqueous solution containing 500 parts of the sodium salt of the sulphuric acid ester of the iso-dodecylphenyl-tri-glycol ether is adjusted to the desired concentration. The product has, when diluted in a suitable manner, good washing, dispersing and, also in combination with other washing agents, a good foaming power.

(16) At 10° C.–30° C., 294 parts of iso-octyl-phenyl-diglycol ether obtainable by condensing phenol with alpha-ethylhexyl alcohol in the presence of ZnCl₂ and reacting with 2 mols of ethylene oxide and having the formula:

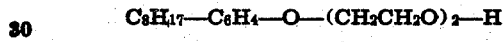

$$C_8H_{17}-C_6H_4-O-(CH_2CH_2O)_2-H$$

are caused to run into 200 parts of sulphuric acid of 100 per cent. strength and the whole is stirred, at about 30° C., until a test portion of the product is, after neutralizing, soluble in water, which occurs in most cases after 3–4 hours. The sulphonation mixture is poured on ice and water and neutralized with caustic soda solution. After evaporation, a viscous salt mass is obtained which contains 396 parts of the sodium salt of the sulphuric acid ester of the above diglycol ether.

(17) 206 parts of tertiary-octylphenol (molecular weight: 206) of the formula:

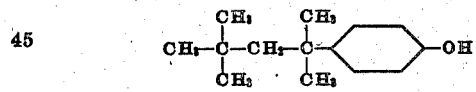

are dissolved in 500 parts of an alcoholic caustic soda solution containing 40 parts of NaOH. Into the solution boiling on the water-bath in a reflux apparatus, there is introduced, while stirring, an alcoholic solution of 230 parts of the sodium salt of the acid sulphuric acid ester of the beta-chloro-beta'-hydroxy-diethyl ether:

$$Cl.CH_2.CH_2.O.CH_2.CH_2.O.SO_3Na$$

After a short boiling, the quantity of sodium chloride the separation of which begins immediately does no longer increase. The whole is allowed to cool, the product is filtered with suction from the sodium chloride and the solvent is distilled off, the latter operation being finally performed under reduced pressure. The sodium salt of the sulphuric acid ester of the tertiary-octylphenyl-diglycol ether is obtained. The product is soluble in water. Its solutions are appropriate for being used as wetting agents.

(18) 244 parts of p-benzylphenoxy-ethyl-hydrosulphide

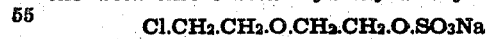

preparable by reaction of p-benzylphenol with 1 mol of ethylene sulphide, are caused to react, in an alcoholic caustic potash solution, with ethylene chlorhydrine; thereby the hydroxy-ethyl sulphide of the above compound is formed:

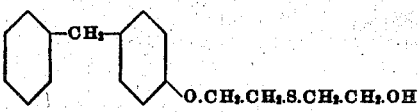

288 parts of benzylphenoxy-ethyl-hydroxyethyl sulphide are dissolved in 300 parts of diethyl ether. At about 15° C. to about 20° C., a solution of 145 parts of chlorosulphonic acid in 200 parts of diethyl ether is caused to run in. The sulphonation complete, 350 parts of ice are added to the mass and the whole is neutralized by introduction of 30 parts of ammonia. The solvent is then distilled off. A thick paste is obtained containing about 50 per cent. of the ammonium salt of the acid sulphuric acid ester of the above-mentioned sulphide. The paste dissolves in water to a clear solution.

(19) 74 parts of glycide are caused to act, at 150° C., upon 235 parts of iso-hexyl-o-cresoxy-ethylamine:

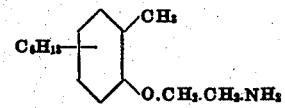

obtainable by condensing ortho-cresol in the presence of AlCl₃ with isohexylene formed by dehydrating isohexyl alcohol obtained from the mixture of high-molecular alcohols formed in the methanol synthesis and reacting with chloroethylamine or bromoethylamine. There is obtained the iso-hexyl-o-cresoxy-ethyl-(dihydroxypropyl)-amine of the formula:

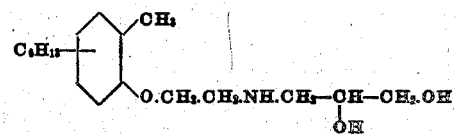

300 parts of this amine are dissolved in 600 parts of methylene chloride, 100 parts of sulphuric acid of 95 per cent. strength are added thereto and, thereupon, there are introduced 120 parts of chlorosulphonic acid. After a short stirring at 10° C.–15° C., the mass is caused to run into 600 parts of a caustic soda solution of 20 per cent. strength which has been cooled to +5° C., vigorous stirring being necessary. The methylene chloride and the water are distilled off and the dry residue is extracted by means of hot alcohol and filtered from the sodium sulphate. The alcohol having been distilled off, there remains the sodium salt of the acid sulphuric acid ester formed in the form of a clear viscous mass. It dissolves in water to a clear solution and its solutions have a good foaming power.

We claim:

1. The compounds of the general formula: R.O.R₁.O.SO₃H wherein R represents a member of the group consisting of aromatic and hydro-aromatic radicals being substituted at least once by a member of the group consisting of aliphatic cycloaliphatic and aliphatic-aromatic radicals with more than 3 carbon atoms, R₁ represents a carbon chain which is interupted at least once by a member of the group consisting of oxygen, sulphur and nitrogen, which in the form of their water-soluble salts possess capillary activity.

2. The compounds of the formula:

$$R.O.(R_2O)_n.R_3.O.SO_3H$$

wherein R represents a six-membered carbocyclic radical being substituted at least once by an aliphatic hydrocarbon radical with more than 3 carbon atoms, $R_2$ stands for an aliphatic hydrocarbon radical with at least 2 carbon atoms, $R_2$ represents an aliphatic hydrocarbon radical and $n$ means a whole number, which in the form of their water-soluble salts possess capillary activity.

3. The product of the formula:

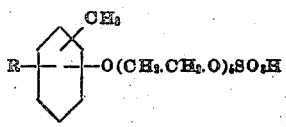

wherein R stands for a mixture of radicals of mineral oil hydrocarbons containing about 12 carbon atoms, the water-soluble salts of which are of capillary activity.

4. The acid sulphuric acid ester of the formula:

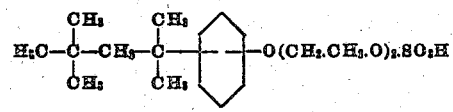

the water-soluble salts of which are of capillary activity.

5. The product of the formula:

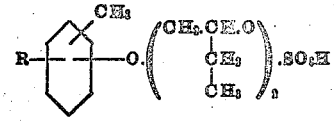

wherein R stands for a mixture of alkyl radicals consisting substantially of tridecyl, the water-soluble salts of which are of capillary activity.

ADOLF STEINDORFF.
GERHARD BALLE.
PAUL HEIMKE.
KARL HORST.